United States Patent
Cho

(10) Patent No.: US 6,817,062 B2
(45) Date of Patent: Nov. 16, 2004

(54) DOOR HINGE APPARATUS HAVING A DOOR CHECKING FUNCTION

(75) Inventor: Kyoung Ho Cho, Ulsan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/321,064

(22) Filed: Dec. 16, 2002

(65) Prior Publication Data

US 2003/0221287 A1 Dec. 4, 2003

(30) Foreign Application Priority Data

May 29, 2002 (KR) ................................. 10-2002-0029821

(51) Int. Cl.$^7$ ............................................ E05D 11/10
(52) U.S. Cl. .............................. 16/328; 16/334; 16/332; 16/50
(58) Field of Search ......................... 16/328, 334, 335, 16/332, 321, 375, 374, 344, 327, 50

(56) References Cited

U.S. PATENT DOCUMENTS

| | | | | |
|---|---|---|---|---|
| 3,722,027 A | * | 3/1973 | Ventre ............................ | 16/50 |
| 4,501,045 A | * | 2/1985 | Boyer ........................... | 16/331 |
| 4,628,568 A | * | 12/1986 | Lee et al. ...................... | 16/337 |
| 4,670,941 A | * | 6/1987 | Peterson ....................... | 16/332 |
| 4,751,766 A | * | 6/1988 | Fahs et al. ..................... | 16/332 |
| 5,067,201 A | * | 11/1991 | Marchione ................... | 16/270 |
| 5,452,501 A | * | 9/1995 | Kramer et al. ................. | 29/11 |
| 6,012,201 A | * | 1/2000 | Mitts et al. ................... | 16/334 |
| 6,073,308 A | * | 6/2000 | Linnenbrink et al. ......... | 16/334 |
| 6,581,243 B2 | * | 6/2003 | Parizel ......................... | 16/334 |

FOREIGN PATENT DOCUMENTS

| | | | | |
|---|---|---|---|---|
| DE | 19909500 A1 | * | 9/2000 | ........... E05D/11/10 |
| DE | 10138397 A1 | * | 2/2003 | ........... E05D/11/10 |
| FR | 2705389 A1 | * | 11/1994 | ........... E05D/11/06 |
| GB | 2199888 A | * | 7/1988 | ........... E05D/11/06 |
| WO | WO 9222722 A1 | * | 12/1992 | ........... E05D/11/10 |

* cited by examiner

*Primary Examiner*—Chuck Y. Mah
(74) *Attorney, Agent, or Firm*—Morgan Lewis & Bockius LLP

(57) ABSTRACT

The present invention provides a door hinge apparatus having a door checking function capable of gradually opening or closing a door of an automobile. The door checking apparatus includes a long groove formed on at least one side portion of a body bracket. The long groove has constricted parts and expanded parts and is formed in accordance with the rotating path of the door bracket about the body bracket. Also provided is a locking means that slideably interacts with the long groove and whereby movement of the door is restricted when the locking means passes through the constricted parts of the long groove.

4 Claims, 3 Drawing Sheets

DOOR HINGE APPARATUS HAVING A DOOR CHECKING FUNCTION

FIELD OF THE INVENTION

The present invention relates to an automobile door hinge. More particularly, the present invention relates to an automobile door hinge providing a door checking function for restricting an opening angle of the door.

BACKGROUND OF THE INVENTION

Conventionally automobiles have doors that open and close by a hinge attached between the door and the automobile body. Often there is a plurality of door hinges fixed to each door of the automobile. The door hinge typically supports the weight of the door and provides for rotation of the door about an axis defined by a hinge pin. The conventional door check assembly checks the door at a middle position in the rotation of the door from closed to open or open to closed. The door check assembly serves to provide a median point for holding the door between fully closed and fully open and it also helps maintain the door in the open position when completely open.

Furthermore, the door check assembly provides a gradual opening or closing of the door, which helps to reduce careless accidents. This is because the door check assembly prevents the door from fully opening or closing suddenly. During opening or closing, the door check assembly absorbs some of the energy associated with the opening and closing and therefore, potentially reduces injury to a user.

Conventionally, one door hinge is installed between an upper part of the door and an upper part of the door body. Another door hinge is often installed between a lower part of the door and a lower part of the door body. A door checking assembly is often disposed between the upper and lower door hinges. Typically, maximum opening angle of the door is controlled by the door checking assembly and is set with a range of about 60 degree to 70 degree.

Typically, the door checking assembly is embodied as an elongated rod. When viewed from above, the door checking assembly has a plurality of rounded portions. One end of the door checking assembly is fixed to the body by a pin and the other end of the door checking assembly is fixed to the door through a stopper. In use, when a user opens or closes the door, the rounded portions pass through a gap provided between rollers. As the wider part of the rounded portions approach the rollers, more force is required to continue opening or closing the door, and therefore, the opening or closing of the door is impeded, absorbing some of the opening or closing energy and slowing the process. Furthermore, when the door is open to its maximum angle, the stopper becomes locked in the body such that the door cannot be opened any further.

However, there is a drawback associated with the conventional door checking assembly. The structure of the conventional door checking assembly is very complicated. It encompasses a large number of small parts and it required separate installation relative to the door hinge. This results in an increase in the cost of production and an increase in assembly time.

SUMMARY OF THE INVENTION

The present invention provides a door hinge apparatus that includes a door checking function that is capable of gradually opening or closing a door of an automobile. The door hinge reduces the number of components, reduces the number of manufacturing steps of the automobile, and lowers the manufacturing cost of the automobile.

The present invention provides a door hinge apparatus that includes a body bracket and a door bracket. The body bracket is fixed to one side of the car body and the door bracket is fixed to the door. The body bracket and the door bracket are pivotally connected to each other by a hinge pin, and the door bracket is rotated about a hinge axis defined by the hinge pin.

Furthermore, a long groove is formed on at least one side portion of the body bracket. The long groove has narrow portions and wider portions and is formed in an arc that matches the rotating path of the door bracket about the body bracket. A locking means is provided whereby a component inserted within the long groove moves from wider portion to wider portion by squeezing through the narrow portions. Therefore, energy associated with opening and closing the door is absorbed, thereby reducing the velocity of the door during opening and closing and serving to lock the door into open positions according to the wider portions of the long groove.

In an alternative embodiment the door hinge checking apparatus comprising a body bracket defining a hinge hole and a checking groove wherein the checking groove is configured in an arc with a plurality of wide and narrow sections. A door bracket defining a hinge hole and a checking hole are also included. Further included is a hinge pin configured to be inserted through the hinge hole in the door bracket and the body bracket. Also included is a checking pin configured to be inserted through the door bracket checking hole and the body bracket checking groove.

It is preferable that the checking pin comprises an elongated member coupled with a spring near one end. It is also preferable that the spring is a plate spring configured to compress through the narrow sections and expand through the wide sections of the checking groove.

BRIEF DESCRIPTION OF THE DRAWINGS

The objects and advantages of the present invention will become better understood by considering the detailed description in consideration with the accompanying drawings, in which.

DETAILED DESCRIPTION OF THE INVENTION

Figure 1:
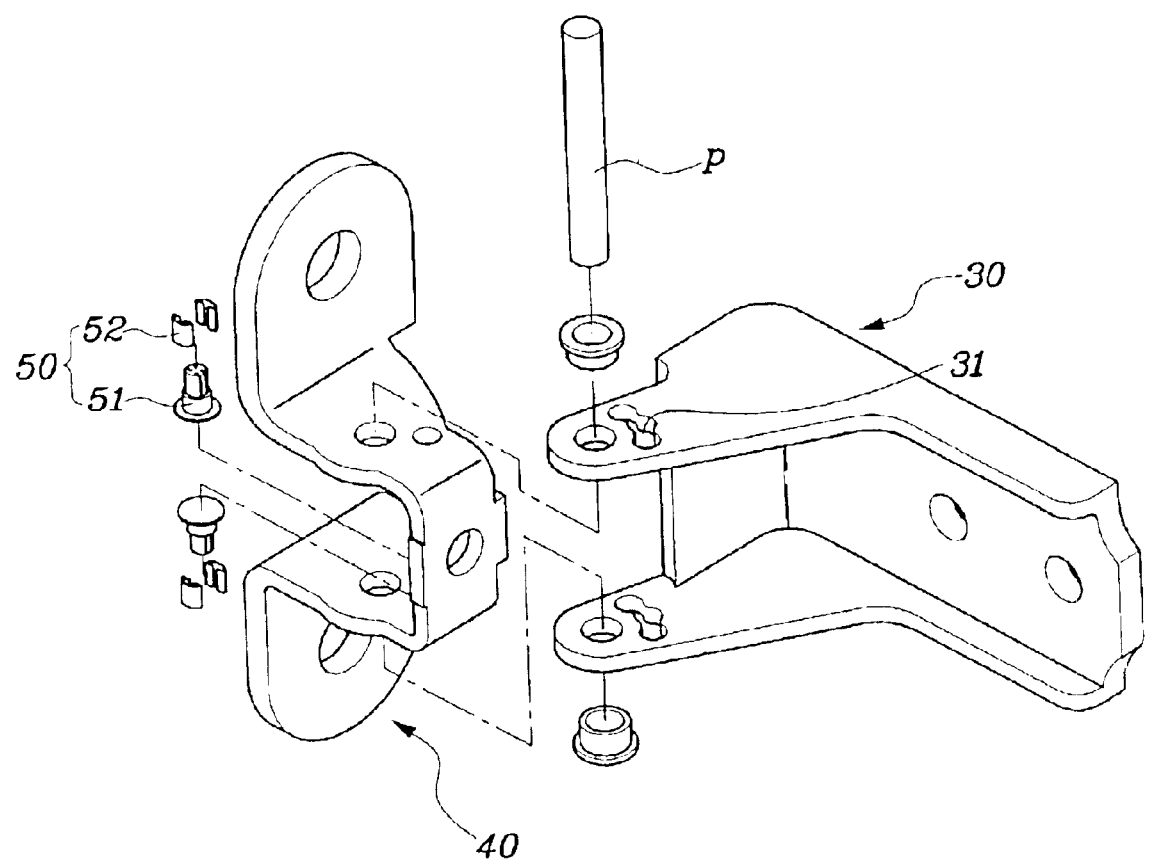
FIG. 1 shows an embodiment of a vehicle door hinge according to an embodiment of the present invention.
Figure 2:
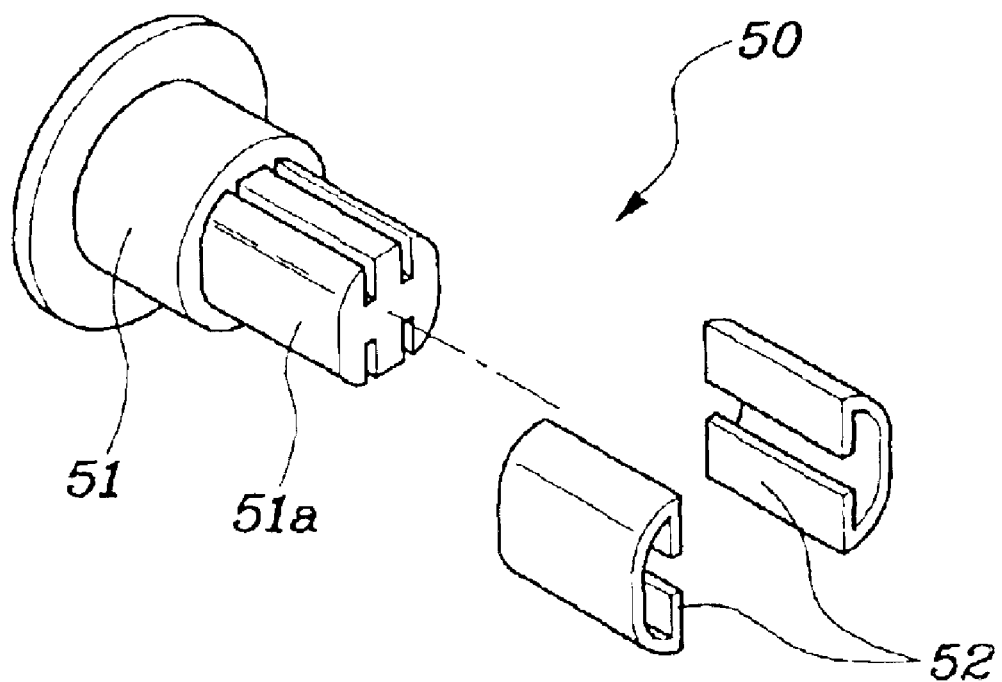
FIG. 2 shows an exploded perspective view of a locking means apparatus according to an embodiment of the present invention.

As shown in FIGS. 1 and 2, a door hinge apparatus according to an embodiment of the present invention includes a body bracket 30 attached to the body of an automobile and a door bracket 40 mounted on the door of the automobile. A hinge pin (P), for pivotally connecting the body bracket 30 and the door bracket 40 to each other is also included. A locking means 50 is included for gradually restricting the pivoting angle of the door bracket 40 during rotation of the door bracket 40 about the hinge axis defined by the hinge pin (P).

Figure 3A:
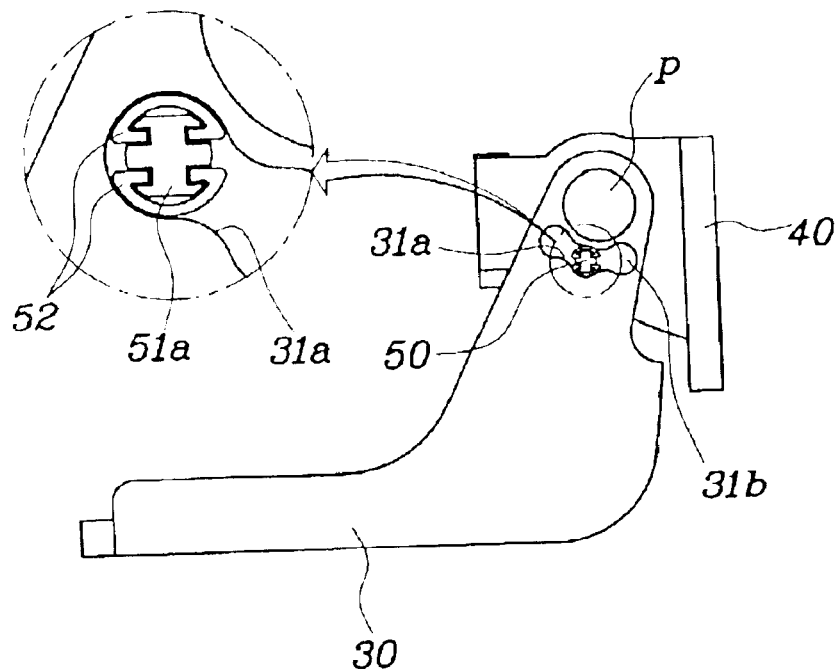
FIGS. 3a and 3b show operational states of a door hinge apparatus according to an embodiment of the present invention.

The body bracket 30 contains a long groove 31 formed on at least one side portion. The long groove 31 has a plurality of constricted parts 31a and expanded parts 31b (FIG. 3a). A locking means 50, FIGS. 1 and 2, is inserted through the door bracket 30 and also through the long groove 31. When the door bracket 40 is rotated about the hinge axis defined by the hinge pin (P), the locking means 50 slideably moves in the long groove 31. The constricted parts 31a (FIG. 3a) serve to reduce the moving velocity of the door by requiring the transfer of some of the moving energy of the door to the locking means 50 to force the locking means 50 through the constricted part 31a. It is preferable that long grooves 31 are formed on both sides of the body bracket 30 such that the force transferred through the locking means 50 is balanced among the body bracket 30.

The plurality of constricted parts 31a and expanded parts 31b are preferably positioned at a distance that coincides with the rotating path of the door such that the door is held in desired locations during opening or closing.

The door bracket 40 has receiving holes for receiving the locking means 50. The receiving holes of the door bracket 40 are positioned to substantially align with the long grooves 31 of the body bracket 30. The locking means 50, FIG. 2, includes a locking protrusion 51 and a plate spring 52. The locking protrusion 51 projects through the receiving hole in the door bracket 40 and the long groove 31 in the body bracket 30. An elastic plate spring 52 is mounted on an outer periphery surface of the distal end 51a of the locking protrusion 51. It is preferable that the plate spring 52 comprises a plate spring that encloses the distal end 51a of the locking protrusion 51 and may be elastically transformed.

Figure 3B:
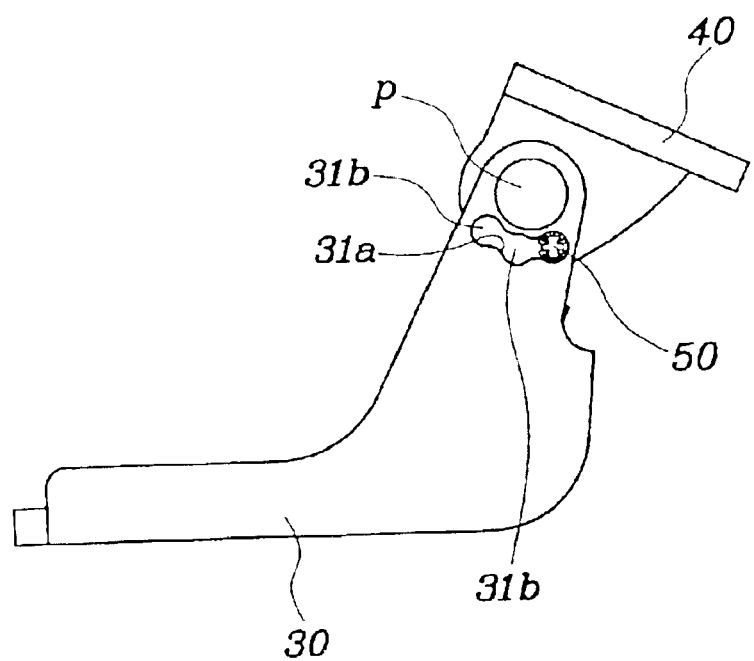

The distal end 51a of the locking protrusion 51, coupled with the plate spring 52 mounted is positioned in the long groove 31 of the body bracket 30. In use, as shown in FIGS. 3a and 3b, the door bracket 40 is rotated about the hinge axis defined by the hinge pin (P), the distal end 51a of the locking protrusion 51 slides along the constricted parts 31a and the expanded parts 31b of the long groove 31. The plate spring 52 constricts when forced to pass through the constricted part 31a. Accordingly, the moving velocity of the locking protrusion 51 becomes slow, thereby slowing the rotational speed of the door bracket 40, and ultimately the door. When the plate spring 52 is positioned at the expanded parts 31b, the locking protrusion 51 stops at the expanded parts 31b due to expansion of the plate spring 52.

The length of the long groove 31 is set in correspondence with a desired opening angle of the door. The constricted parts 31a and the expanded parts 31b are formed in the middle portions of the long groove 31, FIGS. 3a and 3b. When the door is completely open or closed, the locking protrusion 51 is positioned at an expanded part 31b that is associated with the end of the long groove 31. In alternative embodiments, a plurality of expanded parts are formed between the constricted parts 31a. In a preferred embodiment one expanded part 31b is formed between the constricted parts 31b.

Hereinafter, the door hinge apparatus according to a preferable embodiment of the present invention will be explained.

FIGS. 3a and 3b show operational states of the door hinge apparatus according to a preferable embodiment of the present invention. As shown in FIG. 3a, if the door is rotated such that it is completely closed, the locking protrusion 51 of the door bracket 40 is positioned in the expanded part 31b closest to the interior of the vehicle. The plate spring 52 mounted on the distal end 51a is constricted when passed through the constricted parts 31a thereby slowing movement of the door. Accordingly, the door does not suddenly open. It is gradually opened from one expanded part 31b to another.

As shown in FIG. 3b, if the door is further rotated from the state as illustrated in FIG. 3a, the locking protrusion 51 of the door bracket 40 passes through the expanded parts 31b to the adjacent constricted parts 31a. The locking protrusion 51 is then subsequently positioned in another expanded parts 31b. The door is then withheld from further rotation without substantial force because the plate spring 52 of the locking protrusion 51 is locked in the long groove 31.

While the present invention has been described with reference to alternative embodiments, it will be understood by those skilled in the art that various changes in form and detail may be effected therein without departing from the spirit and scope. The scope of the invention is to be defined by the appended claims.

What is claimed is:

1. A door hinge checking apparatus, comprising:

a body bracket fixed to one side of a car body;

a door bracket fixed to one side of a door, wherein the body bracket and the door bracket are pivotally connected to each other by a hinge pin, and wherein the door bracket is rotatable about a hinge axis defined by the hinge pin;

a groove formed on at least one side portion of the body bracket wherein the groove is configured in accord with the path of the door and with constricted parts and expanded parts; and a locking means received in the door bracket and slideable in the groove wherein said locking means acts between the body bracket and door bracket to reduce the velocity of the door moving door by operating in cooperation with the constricted parts of the groove, said locking means comprising a locking protrusion projecting into said groove and a spring elastically mounted on a distal end of the locking protrusion.

2. The apparatus of claim 1, wherein said spring is a plate spring mounted on an outer periphery surface of the distal end of the locking protrusion to be elastically transformed.

3. A door hinge checking apparatus, comprising:

a body bracket defining a hinge hole and a checking groove wherein said checking groove is configured in an arc with a plurality of wide and narrow sections;

a door bracket defining a hinge hole and a checking hole;

a hinge pin configured to be inserted through said hinge hole in said door bracket and said body bracket; and a checking pin configured to be inserted through said door bracket checking hole and said body bracket checking groove, wherein said checking pin comprises an elongated member coupled with a spring near one end.

4. The apparatus of claim 3, wherein said spring is a plate spring configured to compress through said narrow sections and expand through said wide sections of said checking groove.

* * * * *